(12) United States Patent
Holmgren

(10) Patent No.: US 7,055,972 B2
(45) Date of Patent: Jun. 6, 2006

(54) DEVICE FOR AN OPTICAL SYSTEM

(75) Inventor: Olof Holmgren, Solna (SE)

(73) Assignee: FLIR Systems AB, Danderyd (SE)

( * ) Notice: Subject to any disclaimer, the term of this patent is extended or adjusted under 35 U.S.C. 154(b) by 0 days.

(21) Appl. No.: 10/482,578

(22) PCT Filed: Jun. 19, 2002

(86) PCT No.: PCT/SE02/01191

§ 371 (c)(1),
(2), (4) Date: Jun. 3, 2004

(87) PCT Pub. No.: WO03/003097

PCT Pub. Date: Jan. 9, 2003

(65) Prior Publication Data

US 2004/0207932 A1    Oct. 21, 2004

(30) Foreign Application Priority Data

Jun. 29, 2001  (SE) .................................. 0102333

(51) Int. Cl.
*G02B 17/00*  (2006.01)

(52) U.S. Cl. .................................................. 359/613
(58) Field of Classification Search ................ 359/601, 359/613, 726–736, 738, 739
See application file for complete search history.

(56) References Cited

U.S. PATENT DOCUMENTS

| | | |
|---|---|---|
| 4,143,402 A | 3/1979 | Bricot et al. |
| 4,441,175 A | 4/1984 | Shuman |
| 5,652,679 A * | 7/1997 | Freeman ..................... 359/731 |

* cited by examiner

*Primary Examiner*—Scott J. Sugarman
*Assistant Examiner*—Darryl J. Collins
(74) *Attorney, Agent, or Firm*—Connolly Bove Lodge & Hutz LLP; Larry J. Hume

(57) ABSTRACT

An optical device includes an objective and a detector or reticle interacting with the objective via a stop aperture. A decentralizing function for the objective and stop relative to the detector or the reticle is arranged to prevent beams reflected byte surface or surfaces of the detector or reticle from passing back through the stop aperture. By preventing reflection of such beams, little or no reflectance is emitted from the device, thereby making detection of the device more difficult.

11 Claims, 2 Drawing Sheets

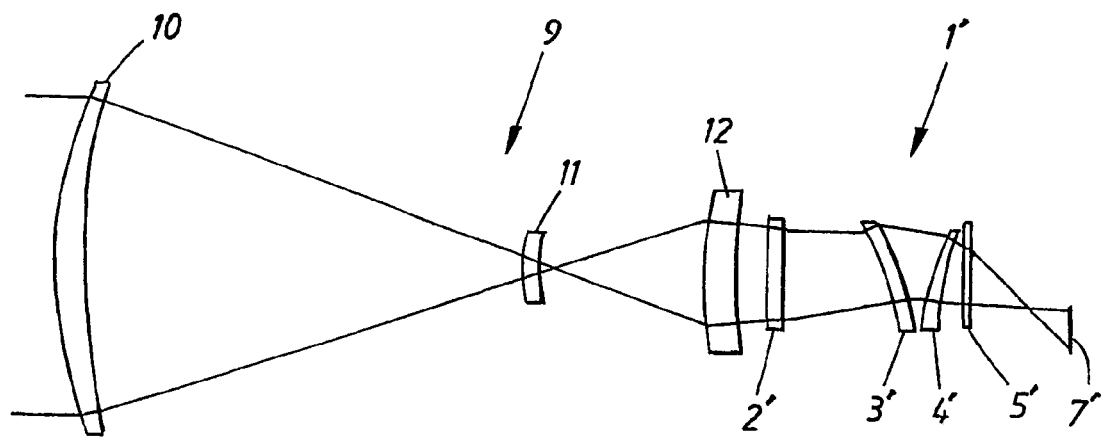

DEVICE FOR AN OPTICAL SYSTEM

CROSS-REFERENCE TO RELATED APPLICATIONS

This application is a National Stage Entry of PCT/SE02/01191 filed on Jun. 19, 2002, which claims priority under 35 U.S.C. §119 to Swedish Application 0102333-2, filed on Jun. 29, 2001.

BACKGROUND OF THE INVENTION

The present invention relates to a device for an optical system that comprises objective and detector (reticle) or detector surface(s) interacting with this via a stop aperture.

The object of the present invention is among other things to prevent reflections in the detector or reticle leaving the optical system and making it possible for other parties to detect or discover the equipment or activity concerned. In order to solve this problem, in military connections there has been an attempt to reduce the reflectance of the detector or reticle. The disadvantage of reducing the reflectance of the detector is that it can be difficult to obtain such a low reflectance as is required and that it is normally not possible to specify unambiguously due to the small values involved. In alternative solutions, an attempt has been made to use blocking filters that block the wavelength of the detecting laser radar. The disadvantage of blocking filters is that the wavelength of the laser radar must be known in advance.

There is thus a need to prevent the said emission of reflections out of the optical system without needing to work with or rely on being able to manufacture the detector or reticle with reflectance that is exceptionally low and difficult to specify. Similarly, there is a desire to avoid the use of blocking filters that require knowledge not only of the detecting equipment but also of the wavelength(s) at which the detecting equipment operates.

SUMMARY OF THE INVENTION

The present invention solves among other things this problem and proposes an arrangement where the reflection can be completely prevented from entering into the beam path. In addition, the invention requires principally only adaptations of known equipment and means therefore that existing routines, procedures and structures can be used essentially unchanged in connection with the construction and use of the new equipment. In addition, previous diameters and cross-section measurements can be retained, which means that previously used external dimensions of the equipment can also be used for the invention.

The new principle can also be used within a wide range of wavelengths that does not need to be restricted in comparison to the case with previous equipment. The new device can also work with afocal optical systems, for example in connection with infrared systems. According to the invention, it is also important that there needs to be no reduction of the incoming beam, but that the optical system can operate with great efficiency also in this respect.

What can primarily be considered to be characteristic of a device of the type described by way of introduction is that the objective and the stop aperture are decentralised or have a decentralising function in relation to the detector (the reticle) or the detector surface(s) and have thereby a degree of decentralisation that prevents beams reflected by the detector (reticle) or detector surface(s) passing back through the stop aperture.

In a preferred embodiment of the invention, the decentralising function of the objective means that only parts of, for example, one half of the objective, viewed in cross section through or at the objective at right angles to the beam path, passes the incoming beam towards the stop aperture. The stop arrangement also needs to work with only parts of its surface (in horizontal view) and can therefore be given reduced dimensions in a similar way as the objective. The stop can be set at an angle in relation to the plane of the detector (reticle) or detector surface so that a more even or improved irradiance distribution is obtained on the detector. The improvement is in comparison to the case when there has not been any setting at an angle of the kind mentioned. Additional embodiments of the concept of the invention are apparent from the subsequent subsidiary claims.

By means of what is described above, new advances are made within the technology, in as much as existing optical systems and stop arrangements are used in a new way. Previous principles for the construction of the equipment can be used, which paves the way for simplified functions as far as technology and economics are concerned.

BRIEF DESCRIPTION OF THE DRAWINGS

A currently proposed embodiment of a device that has the significant characteristics of the invention will be described below with reference to the attached drawings in which FIG. 2 shows in longitudinal section the placing of the objective in an afocal optical arrangement.

DETAILED DESCRIPTION

Figure 1:
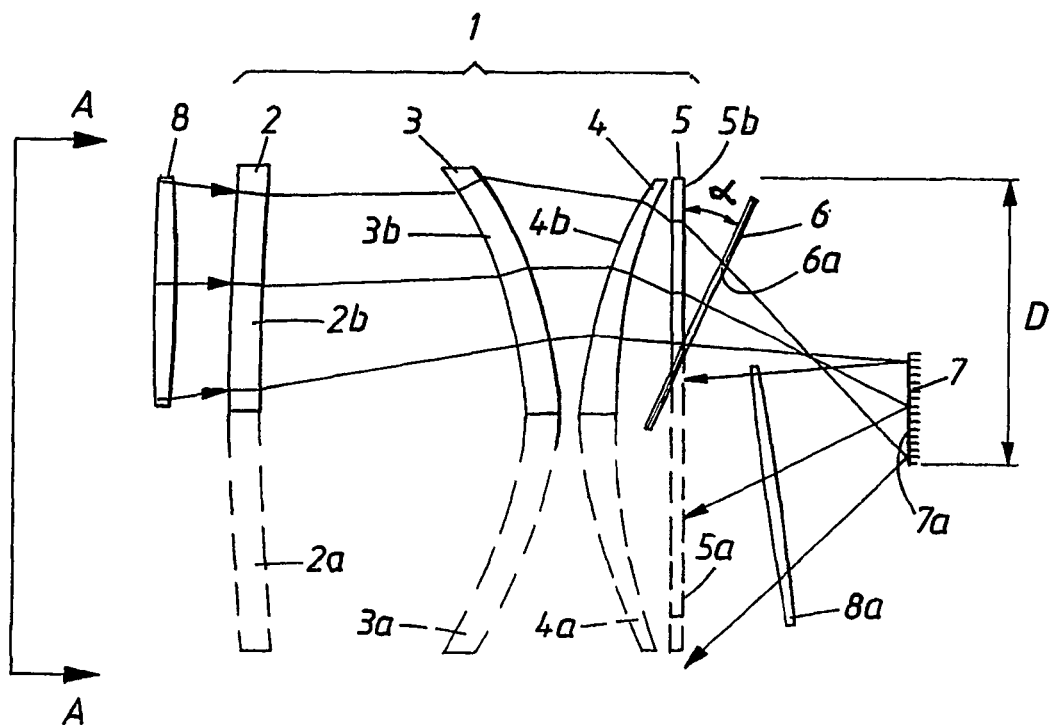
FIG. 1 shows in longitudinal section an example of the arrangement of an objective and a stop in association with the beam path in an optical system that also comprises a front lens and a detector or reticle.

In FIG. 1, an objective comprising a lens system with four lenses 2, 3, 4 and 5 is indicated by 1. The lens 2 is the front lens of the objective. Behind the lens 5 there is a stop arrangement 6. The stop 6 in question comprises a stop aperture 6a. After the stop arrangement 6 there is a detector or reticle 7. The incoming beam is symbolized by 8 and the beam passes in turn through the front lens 2, the lenses 3, 4 and 5 and the stop arrangement 6 and is taken to one or more surfaces 7a on the detector or reticle. The detector/reticle surface(s) reflect parts of the incoming beam and the reflected beam is symbolized in FIG. 1 by 8a.

Figure 1A:
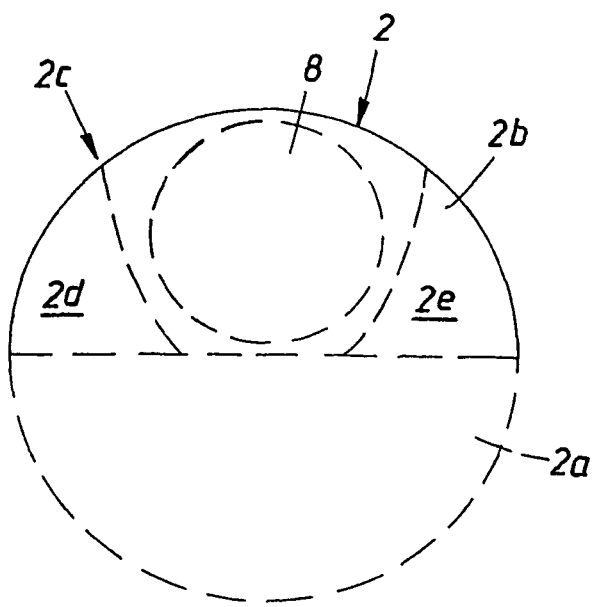
FIG. 1a shows in a horizontal section A—A a concave lens incorporated in the objective and incoming beam that meets this lens.

In the exemplary embodiment, the lens 2 constitutes a negative lens, lenses 3 and 4 are positive lenses and lens 5 is a flat lens. It is characteristic for the lenses according to the invention that they decentralise the beam 8, which meets the front lens 2 at only one half of this lens. The lenses 3, 4 and 5 also decentralise and receive the beam leaving the lens 5 on corresponding parts of their horizontal view extent. This means that in principle superfluous parts 2a, 3a, 4a and 5a do not have a function and can therefore in principle be omitted. The parts 2a, 3a, 4a and 5a can in principle be cut off from the complete manufactured lenses 2, 3, 4 and 5. Alternatively, during manufacture the lenses can be made only with the active parts 2b, 3b, 4b and 5b respectively. FIG. 1a shows for purposes of explanation the propagation of the beam 8 on the active part 2b in question on the lens 2. It is recognised here that additional material reductions 2d and 2e can be carried out on the active half 2c of the lens. The beam path from the lens 5 down to the detector/reticle/surface concerned 7a is given a deflection. In the exemplary embodiment according to FIG. 1, the stop arrangement or the stop 6 is also angled by an angle α in relation to the flat lens 5 in the optical system 1, that is it is angled in relation to a plane that extends at right angles through the lens 5 and at right angles to the plane of the paper. The decentralisation of the optical system means that the reflected beam 8a is prevented from being reflected back through the stop aperture 6a and out into the beam path towards the front lens 2. Different degrees of decentralisation can thereby be used for the objective 1 and the degree of decentralisation is preferably such that all the reflected beam from the surface or surfaces 7a is taken to the side of the stop aperture 6 and the incoming beam, that is as in FIG. 1.

The remaining active parts 2b, 3b, 4b and 5b of the lenses of the objective 1 are arranged in the system in a known way in their fixed positions. The front lens 2 is arranged to receive all the incoming beam 8 so that great efficiency is obtained in the optical system.

In accordance with FIG. 2, an afocal system 9 (cf. the lens system in or for a telescope or a conventional telescope system) can be arranged in front of the objective described above, which is represented in FIG. 2 by 1'. In a corresponding way as in FIG. 1, the objective can comprise a negative lens 2', two positive lenses 3' and 4' and a flat lens 5'. In addition, a detector 7' or reticle is included in a corresponding way. In FIG. 2, the stop arrangement is not specially indicated. The afocal system can be constructed in a known way with a front lens 10, and a lens system with the lenses 11, 12. The placing can be carried out in a conventional way, for example as for an infrared system, in front of the objective 1' in order to place the image of the cold stop on the front lens 10. In FIG. 1, a diameter or cross-section measurement has been indicated by D. In the exemplary embodiment according to FIG. 1, the stop is set at an angle of approximately 60°. The setting at an angle means, as above, that a more even illumination can be obtained on the detector or (the surface(s) of) the reticle. The stop arrangement can be arranged in an alternative way in order to create the angling of the beam path 8 from the lens 5 towards the detector or reticle 7.

The invention is not limited to the embodiment described above by way of example, but can be modified within the framework of the subsequent claims and concept of the invention.

The invention claimed is:

1. A device for an optical system that comprises an objective (1) and detector (reticle) (7) or detector surface(s) (7a) interacting with said objective via a atop aperture (6a), characterized in that the objective (1) and stop aperture (6a) are decentralized or have a decentralizing function in relation to the detector (the reticle) or the detector surface(s) and have thereby a degree of decentralization that essentially prevents beams (8a) reflected by the detector (reticle) or detector surface(s) passing back through the stop aperture (6a), wherein the decentralizing function of the objective (1) means that only parts of, for example, one half (2a) of the objective, viewed in cross section through the objective at right angles to the beam path (8), passes the incoming beam (8) towards the stop aperture wherein the stop (6) is set at an angle or the stop aperture (6a) is arranged to be inclined in relation to the plane of the detector (reticle) or detector surface(s) (7a) at right angles to the beam path (8) in order to obtain a more even irradiance on the detector or detector surface(s) in comparison to the case when there has not been any setting at an angle or at an indentation.

2. A device for an optical system that comprises objective (1) arid detector (reticle) (7) or detector surface(s) (7a) interacting with said objective via a stop aperture (6a), characterized in that the objective (1) and stop aperture (6a) are decentralized or have a decentralizing fraction in relation to the detector (the reticle) or the detector surface(s) and have thereby a degree of decentralization that essentially prevents beams (8a) reflected by the detector (reticle) or detector surface(s) passing back through the stop aperture (6a), wherein the decentralized objective is arranged after an afocal optical system (9).

3. Device according to claim 2, wherein a front lens (2, 10) in the optical system is or can be maximally exposed to the incoming beam (8).

4. A device for an optical system that comprises objective (1) and detector (reticle) (7) or detector surface(s) (7a) interacting with said objective via a stop aperture (6a), characterized in that the objective (1) and stop aperture (6a) are decentralised or have a decentralising function in relation to the detector (the reticle) or the detector surface(s) and have thereby a degree of decentralisation that essentially prevents beams (8a) reflected by the detector (reticle) or detector surface(s) passing back through the stop aperture (6a), wherein retro-reflections in the same direction as the incident beam (8) are essentially prevented in the optical system resulting in a considerably more difficult or totally eliminated risk of discovery for equipment utilizing the optical system.

5. An optical device, comprising:
an objective;
means for directing an incident light beam onto only a decentralized half portion of the objective;
a stop aperture arranged to receive and pass at least a portion of the incident light beam which has passed through the decentralized half portion of the objective, wherein the stop aperture is arranged at a non-perpendicular angle with respect to the incident light beam; and
a detector arranged to receive, on a surface thereof, incident light which has passed through the stop aperture,
wherein the surface of the detector is oriented so as to preclude any reflection of the incident light therefrom from passing back through either of the stop aperture or the objective and outside the optical device.

6. The device of claim 5, wherein the objective comprises a plurality of optical lenses including a front negative lens.

7. The device of claim 5, wherein the objective comprises a plurality of optical lenses inducing a flat lens arranged adjacent to the stop aperture, wherein the stop aperture is arranged at a non-perpendicular angle with respect to the flat lens.

8. The device of claim 5, wherein the objective comprises a front negative lens, two positive lenses arranged adjacent to each other, and a flat lens arranged adjacent to the stop aperture.

9. The device of claim 5, further comprising an afocal optical system arranged before the objective.

10. The device of claim 5, wherein retro-reflections in a same direction as the incident light beam are prevented in the device at least by the arrangement of the stop aperture and detector, and wherein a likelihood of discovery of the device by an external sensor is essentially eliminated.

11. The device of claim 5, wherein the stop aperture comprises a cold stop and wherein the objective is selected to operate within a wavelength in the range of 0.45–14 µm.

* * * * *